(12) United States Patent
Groh et al.

(10) Patent No.: US 10,510,187 B2
(45) Date of Patent: *Dec. 17, 2019

(54) METHOD AND SYSTEM FOR VIRTUAL SENSOR DATA GENERATION WITH DEPTH GROUND TRUTH ANNOTATION

(71) Applicant: Ford Global Technologies, LLC, Dearborn, MI (US)

(72) Inventors: Alexander Groh, Detroit, MI (US); Ashley Elizabeth Micks, Mountain View, CA (US); Vidya Nariyambut Murali, Sunnyvale, CA (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/113,515

(22) Filed: Aug. 27, 2018

(65) Prior Publication Data

US 2018/0365895 A1 Dec. 20, 2018

Related U.S. Application Data

(63) Continuation of application No. 15/079,540, filed on Mar. 24, 2016, now Pat. No. 10,096,158.

(51) Int. Cl.
*G06T 19/00* (2011.01)
*G06T 13/60* (2011.01)
(Continued)

(52) U.S. Cl.
CPC ............ *G06T 19/003* (2013.01); *G06T 13/00* (2013.01); *G06T 13/60* (2013.01); *G06T 15/205* (2013.01);
(Continued)

(58) Field of Classification Search
CPC ..... G06T 19/003; G06T 13/60; G06T 15/205; G06T 15/506; G06T 17/00; G06T 2210/64; G06T 2215/12; G06T 2215/16
See application file for complete search history.

(56) References Cited

U.S. PATENT DOCUMENTS 5,457,493 A 10/1995 Leddy
8,880,272 B1 * 11/2014 Ferguson ............. G05D 1/0212
701/23

(Continued)

FOREIGN PATENT DOCUMENTS

DE 102013224502 A1 6/2014
JP 2009064373 A 2/2009
WO WO 2011113447 A1 9/2011

*Primary Examiner* — Abderrahim Merouan
(74) *Attorney, Agent, or Firm* — David R. Stevens; Stevens Law Group

(57) ABSTRACT

Methods and systems for generating virtual sensor data for developing or testing computer vision detection algorithms are described. A system and a method may involve generating a virtual environment. The system and the method may also involve positioning a virtual sensor at a first location in the virtual environment. The system and the method may also involve recording data characterizing the virtual environment, the data corresponding to information generated by the virtual sensor sensing the virtual environment. The system and the method may further involves annotating the data with a depth map characterizing a spatial relationship between the virtual sensor and the virtual environment.

20 Claims, 5 Drawing Sheets

(51) Int. Cl.
*G06T 15/20* (2011.01)
*G06T 15/50* (2011.01)
*G06T 17/00* (2006.01)
*G06T 13/00* (2011.01)
*G06T 19/20* (2011.01)

(52) U.S. Cl.
CPC ............ *G06T 15/506* (2013.01); *G06T 17/00* (2013.01); *G06T 19/20* (2013.01); *G06T 2210/64* (2013.01); *G06T 2215/12* (2013.01); *G06T 2215/16* (2013.01); *G06T 2219/004* (2013.01)

(56) References Cited

U.S. PATENT DOCUMENTS

| | | |
|---|---|---|
| 8,907,950 B2 | 12/2014 | Miyata |
| 9,386,302 B2 * | 7/2016 | Zeng ................. G06T 7/80 |
| 9,507,346 B1 * | 11/2016 | Levinson ............ G05D 1/0214 |
| 2005/0233810 A1 * | 10/2005 | Chiang .................. A63F 13/12 |
| | | 463/42 |
| 2009/0276111 A1 * | 11/2009 | Wang ................. B60T 8/17551 |
| | | 701/23 |
| 2010/0136507 A1 * | 6/2010 | Miyata .................... G09B 9/04 |
| | | 434/29 |
| 2010/0256836 A1 * | 10/2010 | Mudalige ............... G08G 1/163 |
| | | 701/2 |
| 2014/0104274 A1 * | 4/2014 | Hilliges ................. G06F 3/011 |
| | | 345/424 |
| 2014/0267282 A1 * | 9/2014 | Ren ........................ G01C 21/00 |
| | | 345/428 |
| 2014/0278847 A1 * | 9/2014 | Gallo ................. G06Q 30/0252 |
| | | 705/14.5 |
| 2015/0025708 A1 * | 1/2015 | Anderson ............ A61B 5/6804 |
| | | 701/2 |
| 2015/0104757 A1 * | 4/2015 | Moncrief ............... G09B 9/302 |
| | | 434/38 |
| 2015/0248131 A1 * | 9/2015 | Fairfield .............. G05D 1/0044 |
| | | 701/2 |
| 2015/0309663 A1 * | 10/2015 | Seo ...................... G06F 3/0421 |
| | | 345/175 |
| 2016/0241791 A1 * | 8/2016 | Narayanswamy ...... G06T 15/00 |
| 2016/0260253 A1 * | 9/2016 | Reddy .................. G06T 15/503 |
| 2016/0350930 A1 * | 12/2016 | Lin .......................... G06K 9/66 |
| 2017/0267099 A1 * | 9/2017 | Yerli ....................... B60W 40/08 |

* cited by examiner

METHOD AND SYSTEM FOR VIRTUAL SENSOR DATA GENERATION WITH DEPTH GROUND TRUTH ANNOTATION

CROSS REFERENCE TO RELATED PATENT APPLICATION

The present application is a continuation of U.S. patent application Ser. No. 15/079,540, filed on Mar. 24, 2016, which is incorporated by reference in its entirety.

TECHNICAL FIELD

The present disclosure generally relates to virtual data generation and annotation and, more particularly, to methods and systems for generating virtual sensor data suitable for use in developing, training, testing and proving vehicle-based computer vision algorithms to estimate depths of objects from images.

BACKGROUND

In the development of computer vision algorithms through supervised machine learning to detect objects in a driving environment, diverse sets of sensor data are needed to train, develop, test and prove the detection algorithms and additional downstream functions associated with the algorithms. However, it usually takes considerable money, time and resources to acquire real-world sensor data. For example, to obtain real-world sensor data, sensors may need to be physically disposed along a driving path or mounted on a vehicle, and actual driving runs may need to be performed on various types of roads, for various traffic conditions and under various weather and lighting conditions in order for the sensors to collect numerous sets of sensor data for a variety of scenarios. For instance, for the robustness of the algorithms under various conditions, ambient variables or parameters such as weather, temperature, wind, lighting conditions and other factors may need to be included in the real-world sensor datasets. Consequently, the number of sets of sensor data to be collected may be enormous. In general, sensor data collected from hundreds or even thousands of miles of road, which may include as many as thousands of diverse images, is needed to develop an accurate and reliable computer vision detection algorithm, which translates to considerable amount of time, money and resources required to acquire such data.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

Figure 1:
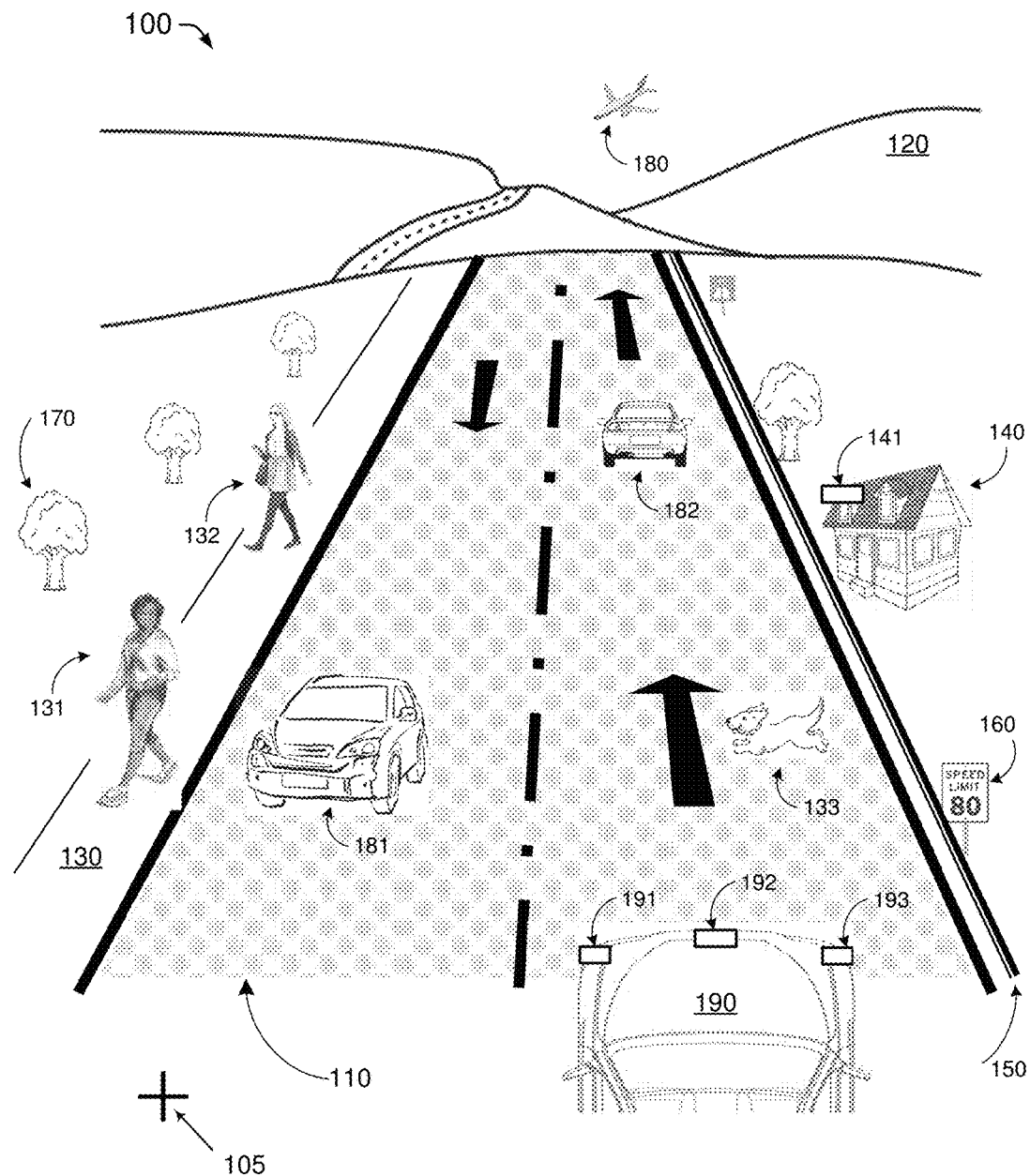
FIG. 1 is a diagram depicting an example scenario in which embodiments in accordance with the present disclosure may be utilized.

In the following description, reference is made to the accompanying drawings that form a part thereof, and in which is shown by way of illustrating specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The following detailed description is, therefore, not to be taken in a limiting sense.

The present disclosure aims to overcome the difficulties, and reduce the cost, of acquiring sensor data needed for the development of a computer vision algorithm. Implementations in accordance with the present disclosure generate sensor data with a virtual environment created by various three-dimensional (3D) modeling techniques and/or animation techniques. Various scenarios, conditions and parameters as mentioned above can be easily set up virtually in the virtual environment, and each of one or more virtual sensors can be disposed at a respective location in the virtual environment to generate a respective set of sensor data in a simulation. Each virtual sensor can be set in a respective orientation with respect to the virtual environment and generate the respective set of sensor data from the respective location in the respective orientation. Each virtual sensor can subsequently be set in another orientation and generate another set of sensor data from that orientation. Furthermore, each virtual sensor can traverse or move about the virtual environment in a simulation and virtually collect (i.e., generate by simulation) more sensor data needed for development of the computer vision algorithm. The virtual environment and the virtual sensor(s) are modeled to closely match the corresponding real-world environment and real-world sensor(s) such that the simulation-generated virtual sensor data substantially represents the same information collected by real-world sensor(s) in the real-world environment.

The virtual environment may include various virtual objects distributed at different locations within the virtual environment. Each virtual object may be either stationary or mobile relative to a stationary reference point of the virtual environment. A stationary virtual object may be, for example, a building standing by the road or a hill located afar. A mobile virtual object may be, for example, a vehicle driving on the road, a pedestrian walking on the sidewalk of the road, an animal running across the road or an airplane flying by.

Furthermore, each virtual object may have a definite size and shape, and take up a certain space around the respective location of the virtual object in the virtual environment. For each virtual object, it may require a number of coordinates in the virtual environment to define a respective space taken up by the virtual object. For a mobile virtual object, the number of coordinates associated with the mobile virtual object may change from one moment to the next in the virtual environment.

FIG. 1 illustrates an example virtual environment 100 in which example embodiments of the present disclosure may be implemented. Virtual environment 100 may have a road 110 that allows either one-way or two-way automobile traffic as represented by moving vehicles 181, 182 and 190. Virtual environment 100 may also have roadside structures such as a side rail or curb 150, a traffic sign 160, commercial signs or billboards (not shown), and a tree 170. Virtual environment 100 may further have buildings such as a house 140, and pedestrians 131 and 132 walking on a sidewalk 130. Virtual environment 100 may also have a hill 120 at the far end of road 110, an airplane 180 flying across the sky, and a dog 133 running across road 110. Those skilled in the art would appreciate that the depiction of virtual environment 100 in FIG. 1 is merely an example for illustrative purpose and that there may be numerous variations of environment 100 with different objects, in terms of number of type. That is, embodiments of virtual environment 100 in accordance with the present disclosure are not limited to the example shown in FIG. 1.

Each of road 110, hill 120, sidewalk 130, pedestrians 131 and 132, dog 133, house 140, curb 150, traffic sign 160, tree 170, vehicles 181, 182 and 190 and airplane 180 is a virtual object within virtual environment 100. Among the virtual objects, road 110, hill 120, sidewalk 130, house 140, curb 150, traffic sign 160 and tree 170 are stationary virtual objects, as they are not moving with respect to a fixed reference point 105 of virtual environment 100. On the other hand, pedestrians 131 and 132, dog 133, vehicles 181, 182 and 190 and airplane 180 are mobile virtual objects, as they are moving with respect to reference point 105.

For each virtual object, a set of coordinates having a number of coordinates associated with the respective virtual object may be used to define the space taken by the virtual object in the virtual environment. Different numbers of coordinates may be used to define different virtual objects. For example, compared with road sign 160, house 140 may have a more complicated structure, and thus may require a larger number of coordinates to define its space within virtual environment 100. For a mobile virtual object, the associated coordinates may change from one moment to a subsequent moment according to a trajectory of movement of the mobile virtual object. The change in the associated coordinates, or the displacement of the mobile virtual object, may be different for different mobile virtual objects in the virtual environment. For example, in FIG. 1, pedestrian 131 may be walking on sidewalk 130 at a speed slower than, and in a direction different from, those of dog 133, which may be running across road 110. Therefore, the displacement of pedestrian 131 from a first moment to a second moment in simulation may be different from the displacement of dog 133 from the first moment to the second moment in simulation, as reflected in changes of the two sets of coordinates that respectively represent pedestrian 131 and dog 133. In contrast, the coordinates used to define the space taken by a stationary virtual object, such as house 140 or road sign 160 for example, do not change from one moment to the next in simulation, as the space taken by a stationary virtual object in virtual environment 100 does not change over time.

To generate a set of sensor data that characterizes virtual environment 100, one or more virtual sensors may be positioned in virtual environment 100. A sensor may be positioned at a stationary location. For instance, sensor 141 may be mounted on house 140. Alternatively, a sensor may be positioned in virtual environment 100 such that it is mobile with respect to reference point 105 of virtual environment 100. When a virtual sensor is positioned such that it is associated with a mobile virtual object in virtual environment 100, such virtual sensor may traverse or otherwise move around virtual environment 100 along with the mobile virtual object. For instance, sensors 191, 192 and 193 may be mounted on moving vehicle 190 and, thus, may traverse or otherwise move around virtual environment 100 in simulation.

Similar to the virtual objects in virtual environment 100, a virtual sensor, such as one of sensors 141, 191, 192 and 193, may be associated with a number of coordinates that define a location of the virtual sensor as well as a space taken by the virtual sensor in virtual environment 100. If the virtual sensor is relatively small compared to virtual environment 100, the space it takes may be negligible for all practical purposes, and the location of such virtual sensor may be represented by a single coordinate. For such a virtual sensor positioned at a stationary location, such as sensor 141 mounted on house 140, the single coordinate representing the location of the virtual sensor may not change during simulation. Alternatively, for a virtual sensor positioned as mobile in virtual environment 100, the single coordinate representing the location of the virtual sensor may change over time in simulation. For example, each of sensors 191, 192 and 193 mounted on vehicle 190 may have its respective location represent by a respective coordinate that changes from one moment to the next in simulation. The change in the coordinate, i.e., the displacement of each of sensors 191, 192 and 193, may be similar to or the same as the displacement of vehicle 190 over time in simulation.

In addition to being positioned or otherwise disposed at a location in virtual environment 100, a virtual sensor may further be set in a certain orientation with respect to virtual environment 100 at its respective location. For example, while virtual sensor 141 may be disposed at an external location (i.e., on the roof) of house 140, virtual sensor 141 may further be set in an orientation such that virtual sensor 141 is facing sidewalk 130 across road 110. Alternatively, virtual sensor 141 may be set in an orientation with respect to virtual environment 100 such that virtual sensor 141 is facing one end of road 110 where vehicle 190 enters road 110. That is, virtual sensor 141 may be set in different orientations with respect to virtual environment 100 while disposed at the same fixed location (i.e., on the roof of house 141), so that virtual sensor 141 may be able to characterize virtual environment 100 from the same location but in various orientations. Namely, the ability to set a virtual sensor in different orientations provides an additional degree of freedom in characterizing the virtual environment by the virtual sensor from a given location in the virtual environment.

In some embodiments, each, some or all of sensors 141, 191, 192 and 193 may include a virtual camera that is configured to characterize virtual environment 100 by taking either still images (i.e., pictures) or moving images (i.e., video), or a combination of both. That is, the sensor data may include stationary and/or moving images of virtual environment 100. Depending on the location and the orientation of a virtual camera, a part of the virtual environment 100 may be characterized by being captured by an image generated by the virtual camera. For example, when the virtual camera of sensor 141 is set in an orientation such that the virtual camera faces sidewalk 130 across road 110, an image generated by the virtual camera of sensor 141 may include information characterizing pedestrians 131 and 132, vehicles 181 and 190, dog 133, tree 170, as well as a part of sidewalk 130 and a part of road 110. However, the image may not include information characterizing hill 120 or airplane 183 due to the orientation of the virtual camera. The image may not even capture vehicle 182 or traffic sign 160, also due to the orientation.

Figure 2:
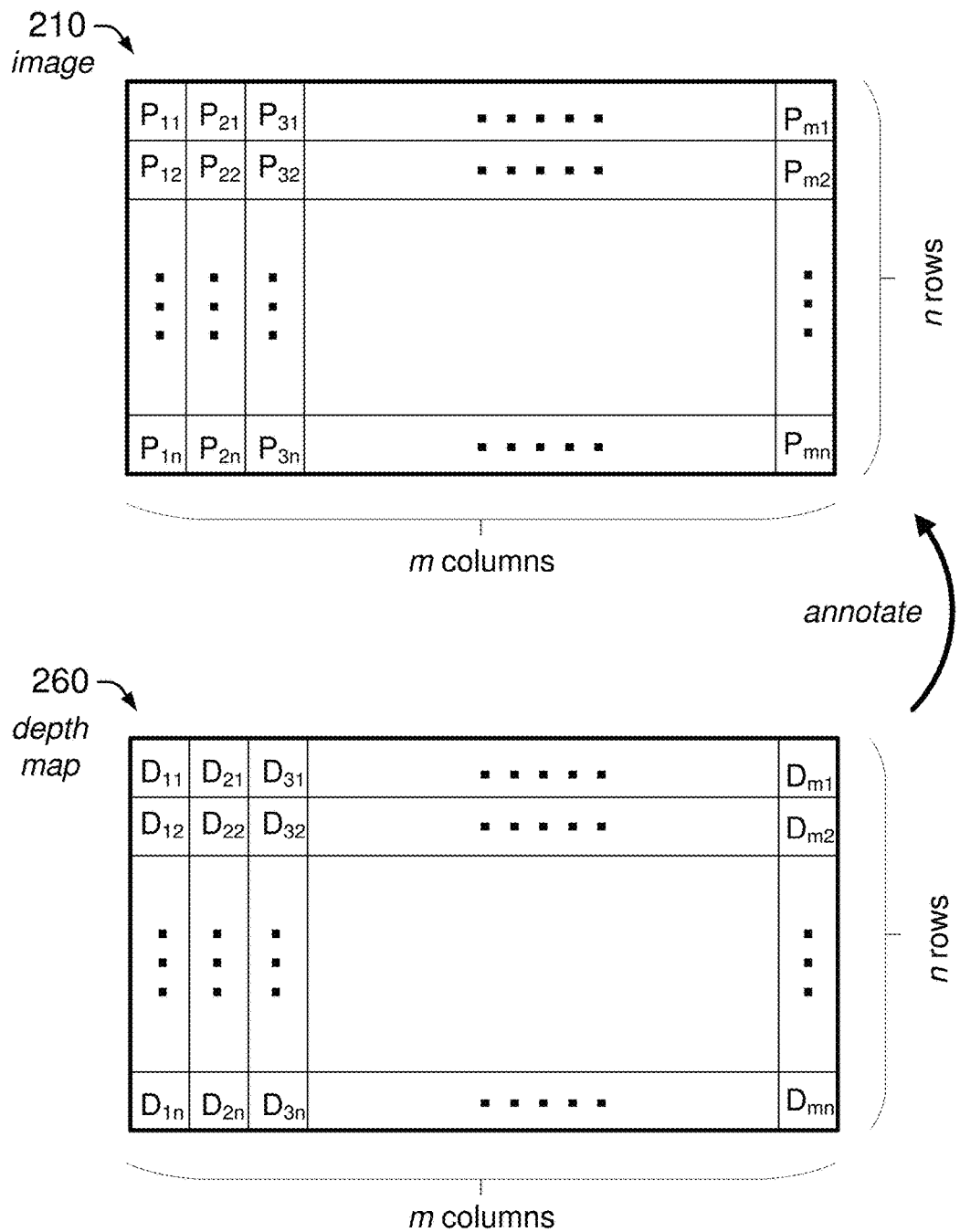
FIG. 2 is a diagram depicting example data characterizing a virtual environment and an example depth map annotating data in accordance with an embodiment of the present disclosure.

An image generated by a virtual camera may include a number of image pixels, and the image pixels may be presented in an array. As shown in FIG. 2, image 210 generated by a virtual camera may include an array of image pixels presented in m columns and n rows, where each of m and n is a positive integer. Each column of the array has a same number of pixels as another column of the array, while each row of the array has a same number of pixels as another row of the array. Therefore, the total number of pixels included in the image is m·n. For example, the first column of image 210 has n pixels, namely, $P_{11}$, $P_{12}$, ..., $P_{1n}$, and the last row of image 210 has m pixels, namely, $P_{1n}$, $P_{2n}$, ..., $P_{mn}$, as shown in FIG. 2. For a high-definition image, m may be 1920 or more, and n may be 1080 or more. For example, an ultra-high-definition (UHD) image may include an array of pixels having as many as 3840 columns and 2160 rows. In various embodiments in accordance with the present disclosure, the numbers of column and row in the array of pixels of an image may vary depending on the actual requirements in implementation.

As an image generated by a virtual camera represents a view of the virtual environment as perceived by the virtual camera, each pixel of the image is therefore rendered to show, or associated with, a virtual object in the virtual environment as perceived by the virtual camera from the location and in the orientation of the virtual camera. Take virtual camera 141 of FIG. 1 as an example, which is positioned at the roof of house 140 and set in an orientation facing sidewalk 130 across road 110. An image 210 generated by virtual camera 141 may include an array of image pixels as shown in FIG. 2. Some of the image pixels of image 210 may thus be rendered to show or otherwise represent pedestrian 131, while some of the image pixels of image 210 may be rendered to show or otherwise represent pedestrian 132. Likewise, some of the image pixels of image 210 may be rendered to show or otherwise represent vehicle 181, some of the image pixels of image 210 may be rendered to show or otherwise represent vehicle 190, and some of the image pixels of image 210 may be rendered to show or otherwise represent dog 133. Still, some of the image pixels of image 210 may be rendered to show or otherwise represent tree 170, some of the image pixels of image 210 may be rendered to show or otherwise represent a part of sidewalk 130, and some of the image pixels of image 210 may be rendered to show or otherwise represent a part of road 110.

For a set of sensor data generated by the virtual sensors to become useful for developing, training, testing and proving computer vision algorithms, the set of sensor data needs to be annotated with ground truth information. In some embodiments, the ground truth information is presented in a form of a depth map for each image generated by the virtual sensor. As shown in FIG. 2, image 210 is annotated by a corresponding depth map 260 which contains depth ground truth information. Depth map 260 may include an array of elements, with the array of elements having the same size as the array of pixels of image 210. That is, the array of elements of depth map 260 also has m columns and n rows, giving a total of m·n elements. In fact, the elements in depth map 260 have a 1-to-1 correspondence with the pixels in image 210. For example, element $D_{11}$ of depth map 260 corresponds to pixel $P_{11}$ of image 210, and element $D_{12}$ of depth map 260 corresponds to pixel $P_{12}$ of image 210. Likewise, element $D_{mn}$ of depth map 260 corresponds to pixel $P_{mn}$ of image 210.

Each element of the depth map may store a numerical value that indicates, represents, or otherwise corresponds to a distance in the virtual environment between the virtual sensor and the virtual object rendered at the corresponding image pixel. For example, pixel $P_{32}$ of image 210 generated by virtual camera 141 may be rendered to show, or associated with, a part of tree 170. Therefore, the corresponding element $D_{32}$ of depth map 260 may contain a numerical value corresponding to the distance between that part of tree 170 and virtual camera 141 in virtual environment 100. As another example, pixel $P_{m1}$ of image 210 generated by virtual camera 141 may be rendered to show, or associated with, a part of sidewalk 130. Therefore, the corresponding element $D_{m1}$ of depth map 260 may contain a numerical value corresponding to the distance between that part of sidewalk 130 and virtual camera 141 in virtual environment 100.

As opposed to real-world sensor data collection where the distance between a real-world sensor and an object in the actual driving environment is measured using expensive and time-consuming equipment such as depth scanners, the distance between a virtual sensor and any virtual object in the virtual environment can be readily calculated, e.g., by a processor of a computing apparatus, as the locations of each virtual sensor and each virtual object at any time during a simulation are known information. For example, the numerical value to be stored in element $D_{32}$ of depth map 260 can be readily calculated using the coordinate(s) of tree 170 and the coordinate of virtual camera 141. As another example, the numerical value to be stored in element $D_{m1}$ of depth map 260 can be readily calculated using the coordinate of virtual camera 141 and the coordinate of the part of sidewalk 130 rendered at pixel $P_{32}$ of image 210 generated by virtual camera 141.

As previously mentioned, in order to develop robust computer vision algorithms under various conditions, ambient variables or parameters such as weather, temperature, wind, lighting conditions and other factors may need to be included in the real-world sensor datasets. While it takes considerable amount of time, money and resources to acquire such data in a real-world scenario, considerably less effort is required to generate sensor data accounting for the various environmental conditions. In some embodiments, an image characterizing a particular part of the virtual environment under a first environmental condition may be rendered by one or more ambient parameters to generate another image characterizing the same particular part of the virtual environment under a second environmental condition that is different from the first environmental condition. For example, image 310 of FIG. 3, having pixels $P_{11}$-$P_{mn}$, may represent a view of a part of virtual environment 100 as perceived by virtual camera 192 at a particular moment during simulation under a fair weather condition. Image 310 may then be rendered, through adjustment of one or more ambient parameters, into image 320, having pixels $Q_{11}$-$Q_{mn}$, that may represent a view of the same part of virtual environment 100 as perceived by virtual camera 192 at the same particular moment during simulation under a foggy condition. Alternatively or subsequently, image 310 may be rendered, through adjustment of one or more ambient parameters, into image 330, having pixels $R_{11}$-$R_{mn}$, that may represent a view of the same part of virtual environment 100 as perceived by virtual camera 192 at the same particular moment during simulation in twilight hours. For example, pixel $P_{32}$ of image 310 may be rendered into pixel $Q_{32}$ of image 320 to characterize a part of tree 170 under a foggy condition, while pixel $P_{32}$ of image 310 may also be rendered into pixel $R_{32}$ of image 330 to characterize the same part of tree 170 under a twilight condition.

Notably, as each of images 310, 320 and 330 represent a view characterizing the same part of virtual environment 100 from the same virtual camera 192 that is positioned in the same location in the same orientation, the three images 310, 320 and 330 may be annotated with the same depth map 360. That is, each of the corresponding pixels of images 310, 320 and 330 may be associated with the same numerical value stored in the respective element of depth map 360. For example, each of pixel $P_{32}$ of image 310, pixel $Q_{32}$ of image 320 and pixel $R_{32}$ of image 330 may characterize tree 170 as perceived by virtual camera 192 at a particular moment during simulation but under a respective environment condition, and can be annotated by the same element $D_{32}$ of depth map 360 as the distance between a part of tree 170 and virtual camera 192 at that particular moment during simulation may be the same for all three simulated environmental conditions.

Figure 3:
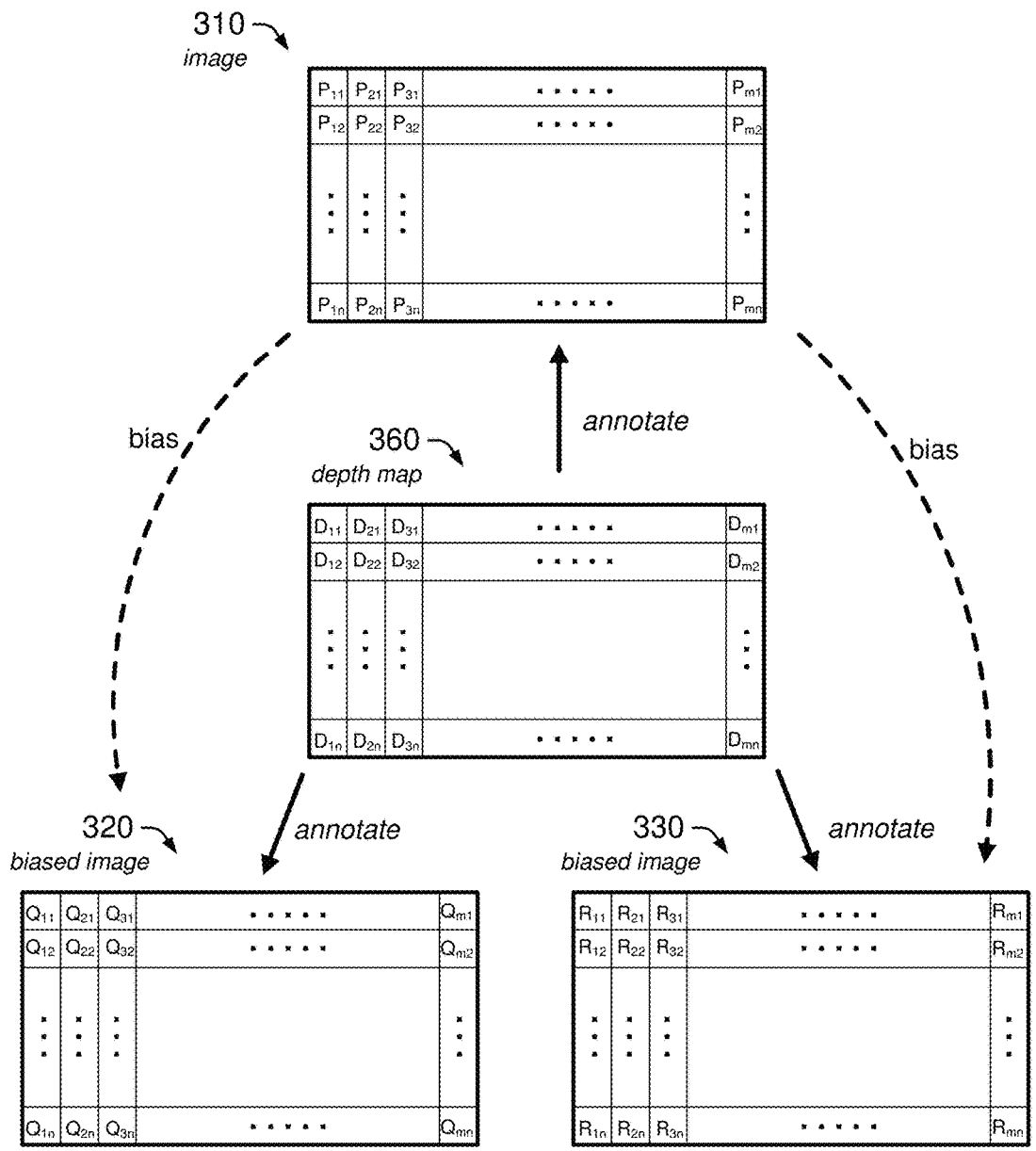
FIG. 3 is a diagram depicting example images characterizing a part of a virtual environment with different ambient parameter settings, and an example depth map annotating each of the images in accordance with an embodiment of the present disclosure.

Furthermore, it is noteworthy that the technique for generating images characterizing a particular part of the virtual environment under various environmental conditions, as demonstrated above with images 310, 320 and 330, is equally applicable to still images and moving images. Similarly, the technique for annotating images, as demonstrated above with FIGS. 2 and 3, is also equally applicable to still images and moving images. Moreover, it is noteworthy that embodiments of annotating images and generating images in accordance with the present disclosure are not limited to the examples shown in FIGS. 2 and 3. In addition, it is noteworthy that, while multiple images, each annotated by the same depth ground truth data as depth map 360, may be generated with the employment of the ambient parameters as described above to account for various weather conditions and lighting conditions, embodiments of the present disclosure do not require multiple images to be taken from the same exact location under different conditions. In other words, some embodiments in accordance with the present disclosure may simply involve generating images from various locations within a virtual environment, varying weather conditions from one image to the next and/or generating the corresponding depth ground truth for each of the images, without requiring two or more images taken from or otherwise generated for a same exact location for characterizing a same view of the virtual environment under different weather conditions or lighting conditions.

Figure 4:
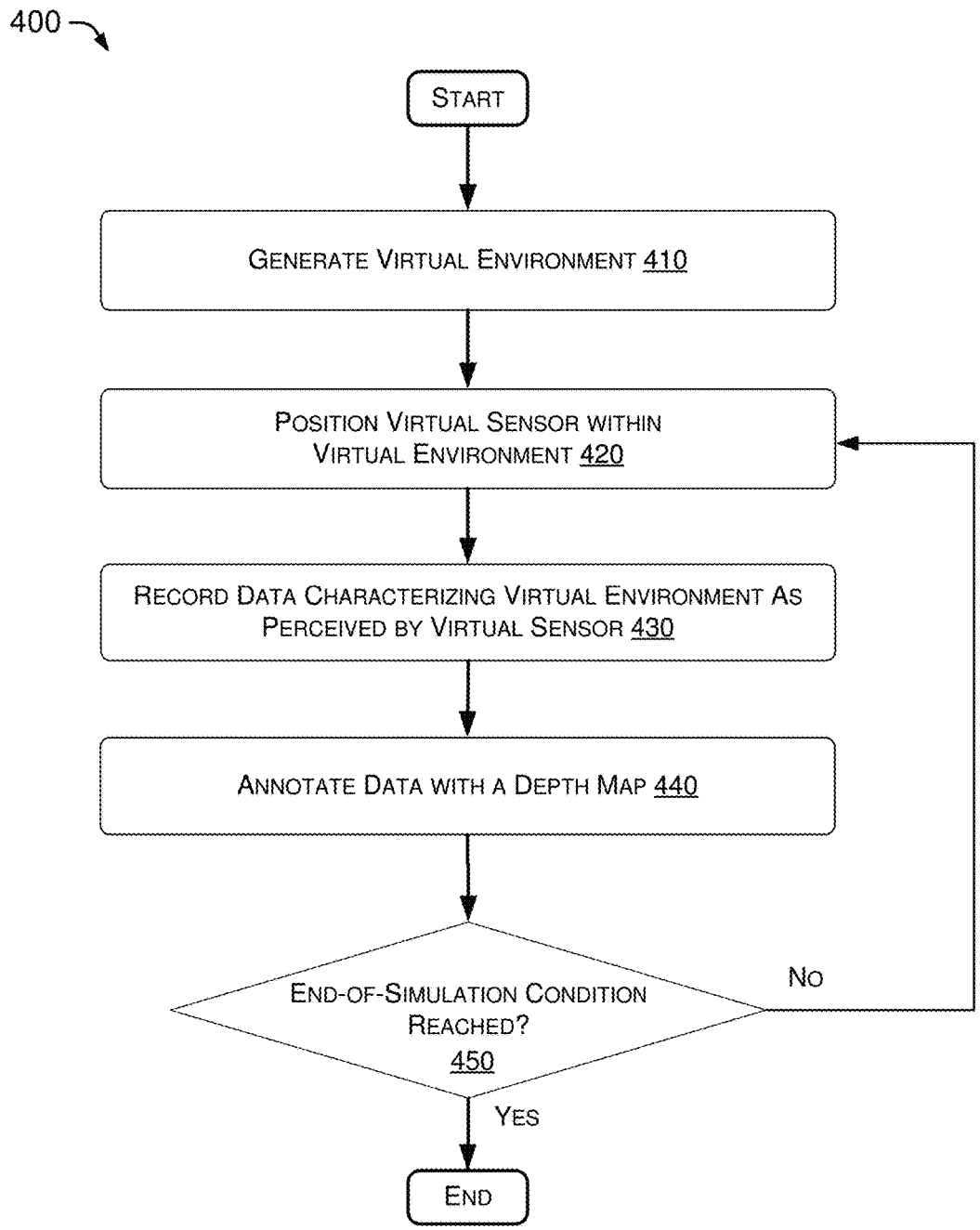
FIG. 4 is a flowchart of an example process in accordance with an embodiment of the present disclosure.

FIG. 4 illustrates an example process 400 for generating virtual sensor data for developing or testing computer vision detection algorithms in accordance with the present disclosure. Process 400 may include one or more operations, actions, or functions shown as blocks such as 410, 420, 430, 440 and 450. Although illustrated as discrete blocks, various blocks of process 400 may be divided into additional blocks, combined into fewer blocks, or eliminated, depending on the desired implementation. Process 400 may begin with block 410.

At 410, process 400 may involve a processor generating a virtual environment (e.g., virtual environment 100). The generation of virtual environment may involve setting up various virtual objects by assigning one or more coordinates to each of the virtual objects. The virtual objects may include stationary virtual objects (e.g., road 110, hill 120, sidewalk 130, house 140, curb 150, traffic sign 160 and tree 170) and mobile virtual objects (e.g., pedestrians 131 and 132, dog 133, vehicles 181, 182 and 190 and airplane 180). Block 410 may be followed by block 420.

At 420, process 400 may involve the processor positioning one or more virtual sensors (e.g., virtual sensors 141, 191, 192 and 193) in the virtual environment (e.g., virtual environment 100). For each of the one or more virtual sensors, the positioning may involve assigning a coordinate for the location of the virtual sensor and setting an orientation with respect to the virtual environment. The positioning may also involve determining a location and an orientation for the virtual sensor according to a predetermined trajectory of movement of the virtual sensor. Block 420 may be followed by block 430.

At 430, process 400 may involve the processor recording data (e.g., image 310) characterizing the virtual environment as perceived by the one or more virtual sensors (e.g., virtual sensor 192). At 430, process 400 may further involve the processor recording data (e.g., images 320 and 330) that accounts for a weather condition and/or a lighting condition of the virtual environment. Block 430 may be followed by block 440.

At 440, process 400 may involve the processor annotating the recorded data (e.g., images 310, 320 and 330) with a depth map (e.g., depth map 360). The annotating of the recorded data may involve the processor calculating and storing, for each element of the depth map, a distance between the virtual sensor and a respective virtual object associated with the respective element of the depth map. For example, process 400 may involve the processor calculating a distance between a part of tree 170 that is rendered at pixel $P_{32}$ of image 310 and virtual camera 192, and storing a numerical value associated with the calculated distance at element $D_{32}$ of depth map 360. Block 440 may be followed by block 450.

At 450, process 400 may involve the processor determining whether an end-of-simulation condition is reached. An end-of-simulation condition may be determined as being reached when, for example, a predetermined number of images have been generated by the one or more virtual sensors. An end-of-simulation condition may also be determined as being reached when, as another example, a predetermined mileage has been traversed by a vehicle (e.g., vehicle 190) carrying one or more virtual sensors (e.g., virtual sensors 191, 192 and 193). In addition, an end-of-simulation condition may be determined as being reached when, as yet another example, a predetermined simulation time has been reached. In response to a determination that an end-of-simulation condition has been reached, process 400 may end. Alternatively, in response to a determination that an end-of-simulation condition has not been reached, process 400 may proceed to block 420 to re-position each, some or all of the one or more virtual sensors to different location(s) with or without changing the orientation thereof.

Figure 5:
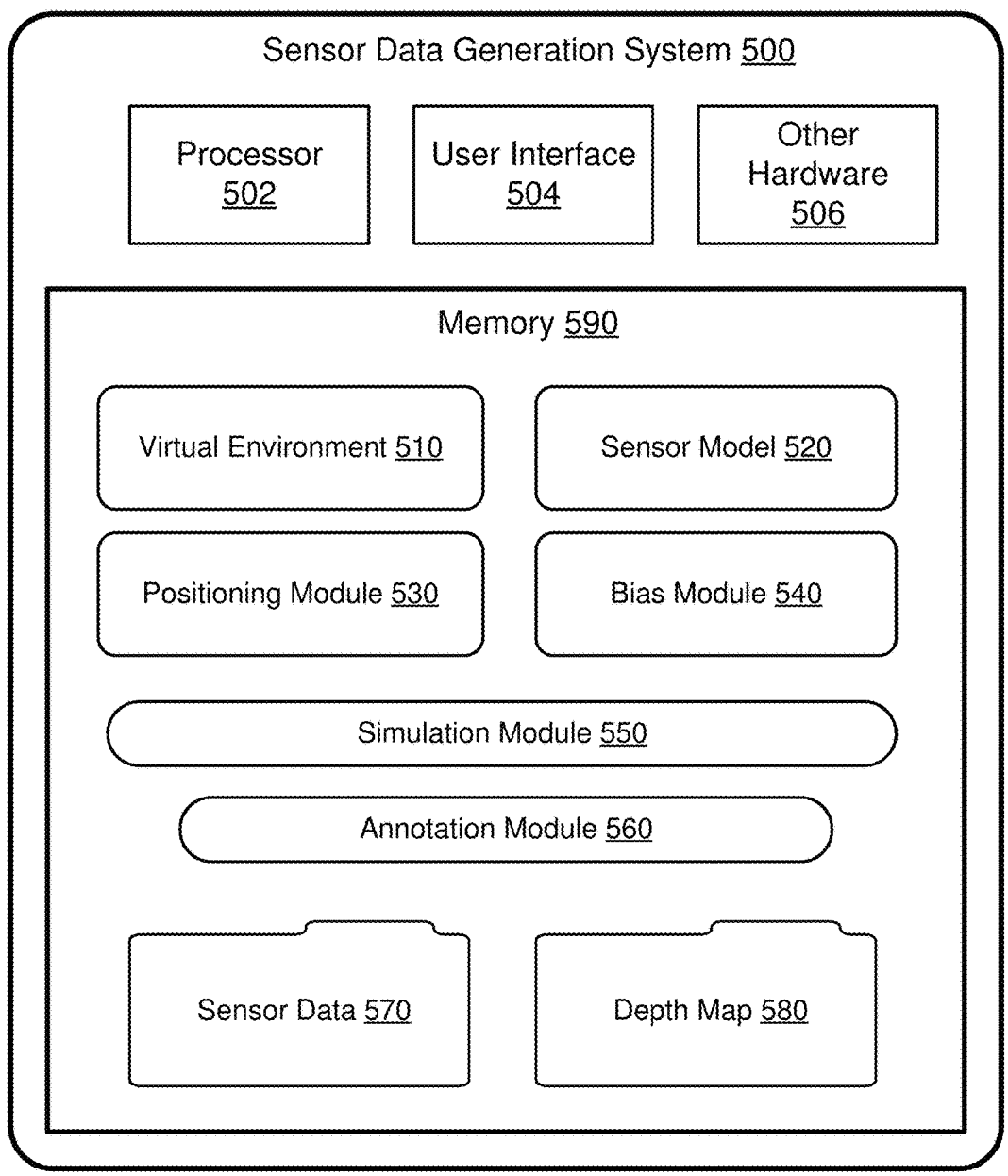
FIG. 5 is a diagram depicting an example system in accordance with an embodiment of the present disclosure.

FIG. 5 illustrates an example sensor data generation system 500 in which example embodiments of the present disclosure may be implemented. Sensor data generation system 500 may execute one or more simulations in order to produce a set of sensor data 570 suitable for developing, testing, and/or training various computer vision detection algorithms. Sensor data generation system 500 may do this with any suitable method, including example process 400. Sensor data generation system 500 may be embodied as hardware, software, or a combination thereof. In some implementations, sensor data generation system 500 may be a computing apparatus such as, for example and not limited to, a laptop computer, a tablet computer, a notebook computer, a desktop computer, a server, a smartphone and a wearable device.

In some embodiments, sensor data generation system 500 may include one or more processors 502, memory 590, user interface 504, other hardware 506 such as, for example, a field-programmable gate array (FPGA), a graphics processing unit (GPU), or the like, or a combination or sub-combination thereof. Memory 590 may be operably connected to or otherwise accessible by the one or more processors 502, and may be configured to store one or more computer software components for execution by the one or more processors 502.

User interface 504 may enable a user, e.g., an engineer, technician or the like, to interact with, run, customize, or control various aspects of sensor data generation system 500. In some embodiments, user interface 504 may include one or more keypads, keyboards, touch screens, pointing devices, or the like or a combination or sub-combination thereof.

In some embodiments, memory 590 may store data, codes and/or instructions pertaining to or otherwise defining one or more virtual environments 510, of which virtual environment 100 described above may be an example. The one or more virtual environments 510 may contain various virtual objects and structures such as those shown in and described above with respect to FIG. 1. Memory 590 may also store at least those components shown in FIG. 5 such as, for example, one or more sensor models 520, positioning module 530, ambience module 540, simulation module 550, annotation module 560, sensor data 570 and one or more depth maps 580.

In some embodiments, virtual environment 510 may include a three-dimensional mesh defining locations, orientations, sizes, shapes, colors, surface reflectiveness and other characteristics of virtual objects in a virtual space, such as some or all of the stationary virtual objects in virtual environment 100 as illustrated in FIG. 1, including road 110, hill 120, sidewalk 130, house 140, curb 150, traffic sign 160 and tree 170. In some embodiments, virtual environment 510 may also define characteristics of mobile virtual objects such as, for example, pedestrians 131 and 132, dog 133, vehicles 181, 182 and 190 and airplane 180 as illustrated in FIG. 1, including but not limited to speed, moving direction, acceleration/deceleration and turning of each of the mobile virtual objects.

In some embodiments, each sensor model 520 may be a software model that defines or predicts the output of a corresponding real-world sensor. Different sensors may characterize differently in the real world. For example, a stereo camera may characterize differently from a panoramic camera. Therefore, the one or more sensor models 520 may include a respective sensor model to model each type of camera for a number of types of cameras including but not limited to stereo camera and panoramic camera.

In some embodiments, positioning module 530 may be utilized to set a location and an orientation of a virtual sensor in the virtual environment 510. For example, in the context of virtual environment 510 being modeled as virtual environment 100, positioning module 530 may dispose virtual sensor 141 on an external location of the roof of house 140, and set virtual sensor 141 in an orientation facing sidewalk 130 across road 110. As another example, positioning module 530 may determine, for each moment during simulation, a location and an orientation of virtual sensor 192 based on a trajectory of vehicle 190 on which sensor 192 is mounted.

In some embodiments, ambience module 540 may be utilized to account for a weather condition (e.g., foggy, rainy, snowing or sunny) and/or a lighting condition (e.g., bright, twilight or dark) of the virtual environment. A number of ambient parameters may be adjusted to reflect a change in the ambient weather or lighting condition. For example, a weather parameter of ambience module 540 may be adjusted for an image taken under a fair weather condition to render the image into another image that would characterize the same view of virtual environment 100 under a foggy weather. As another example, a lighting parameter of ambience module 540 may be adjusted for the image taken under the fair weather condition to render the image into yet another image that would characterize the same view of virtual environment 100 under a twilight condition.

In some embodiments, simulation module 550 may take input from virtual environment 510, sensor model 520 and positioning module 530 to produce a set of data modeling an output of a sensor in a real-world scenario. For example, simulation module 550 may produce image 210 characterizing a part of virtual environment 100 and having an array of m columns by n rows of image pixels. Each pixel of image 210 may be associated with a part of a virtual object as rendered or otherwise represented by the pixel. In some embodiments, annotation module 560 may annotate image 210 with depth map 260, which has an array of numerical values that is the same size as the array of pixels of image 210. Each element of depth map 260 may correspond to a respective pixel of image 210, and store a numerical value associated with the distance between the virtual sensor and a respective part of the virtual object rendered at the respective pixel. In some embodiments, memory 590 may store sensor data 570 which includes a plurality of virtual images produced by simulation module 550. In some embodiments, memory 590 may also store depth maps 580 annotating the plurality of virtual images.

Numerous advantages are resulted according to the systems and methods as manifested in various embodiments of the present disclosure. The advantages include, at least, quickly generating sensor data in the virtual environment with annotated depth ground truth, the sensor data suitable for developing, training, testing and proving vehicle-based computer vision detection algorithms.

The articles "a" and "an" are used herein to refer to one or to more than one (i.e., to at least one) of the grammatical object of the article. By way of example, "a user" means one user or more than one users. Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, databases, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Embodiments in accordance with the present disclosure may be embodied as an apparatus, method, or computer program product. Accordingly, the present disclosure may take the form of an entirely hardware-comprised embodiment, an entirely software-comprised embodiment (including firmware, resident software, micro-code or the like), or an embodiment combining software and hardware aspects that may all generally be referred to herein as a "circuit," "module," or "system." Furthermore, embodiments of the present disclosure may take the form of a computer program product embodied in any tangible medium of expression having computer-usable program code embodied in the medium.

The flow diagrams and block diagrams in the attached figures illustrate the architecture, functionality, and operation of possible implementations of systems, methods, and computer program products according to various embodiments of the present disclosure. In this regard, each block in the flow diagrams or block diagrams may represent a module, segment, or portion of code, which comprises one or more executable instructions for implementing the specified logical function(s). It will also be noted that each block of the block diagrams and/or flow diagrams, and combinations of blocks in the block diagrams and/or flow diagrams, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow diagram and/or block diagram block or blocks.

Although the present disclosure is described in terms of certain embodiments, other embodiments will be apparent to those of ordinary skill in the art, given the benefit of this disclosure, including embodiments that do not provide all of the benefits and features set forth herein, which are also within the scope of this disclosure. It is to be understood that other embodiments may be utilized, without departing from the scope of the present disclosure.

What is claimed is:

1. A method, comprising:
    performing a process to develop, test or train a computer vision detection algorithm by modeling a real-word environment with a virtual environment, the process comprising:
        generating, by a processor, a virtual environment with a virtual sensor therein;
        positioning, by the processor, the virtual sensor on a mobile virtual object in the virtual environment;
        generating, by the processor, simulation-generated data characterizing the virtual environment as perceived by the virtual sensor as the mobile virtual object and the virtual sensor move around in the virtual environment; and
        recording, by the processor, the simulation-generated data,
    wherein the simulation-generated data represents information collected by one or more real-word sensors in the real-word environment.

2. The method of claim 1, further comprising:
    moving, by the processor, the virtual sensor from the first location to a second location in the virtual environment such that the virtual sensor is configured to sense the virtual environment from the second location, along a path between the first location and the second location, or both; and
    annotating, by the processor, the data with a depth map characterizing a spatial relationship between the virtual sensor and the virtual environment.

3. The method of claim 1, wherein the virtual environment comprises a plurality of virtual objects distributed therewithin, each of the virtual objects either stationary or mobile relative to the virtual sensor, and each of the virtual objects sensible by the virtual sensor.

4. The method of claim 3, wherein the spatial relationship comprises distance information of one or more of the plurality of virtual objects with respect to the virtual sensor.

5. The method of claim 3, wherein the virtual sensor comprises a virtual camera, and wherein the data comprises one or more virtual images of the plurality of virtual objects within the virtual environment as perceived by the virtual camera at the first location.

6. The method of claim 1, wherein the positioning of the virtual sensor at the first location comprises disposing a virtual camera at the first location and setting the virtual camera in a first orientation with respect to the virtual environment, and wherein the data corresponds to information generated by the virtual camera sensing the virtual environment from the first location in the first orientation.

7. The method of claim 6, further comprising:
    moving, by the processor, the virtual camera from the first location to a second location in the virtual environment such that the virtual camera is configured to sense the virtual environment from the second location; and
    setting, by the processor, the virtual camera in a second orientation with respect to the virtual environment such that the virtual camera is configured to sense the virtual environment in the second orientation.

8. The method of claim 1, wherein the data comprises one or more virtual images, wherein each of the one or more virtual images comprises an array of pixels, and wherein each pixel of the array of pixels is associated with one of a plurality of virtual objects in the virtual environment as perceived by the virtual camera at the first location.

9. The method of claim 8, wherein the depth map comprises an array of elements, each element of the array of elements corresponding to a respective pixel of the array of pixels and comprising a respective numerical value, each numerical value corresponding to a distance in the virtual environment between the virtual sensor and a respective one of the plurality of virtual objects associated with the respective pixel.

10. The method of claim 9, further comprising:
    calculating, by the processor, the distance between the virtual sensor and the respective one of the plurality of virtual objects associated with the respective pixel based on a coordinate of the first location and a coordinate of the respective one of the plurality of virtual objects in the virtual environment.

11. The method of claim 1, wherein the data further corresponds to one or more ambient parameters configured to account for at least a weather condition and a lighting condition of the virtual environment.

12. The method of claim 1, wherein the generating of the virtual environment comprises employing at least three-dimensional (3D) modeling techniques and animation techniques.

13. A sensor data generation system, comprising:
    one or more processors; and
    memory operably connected to the one or more processors, the memory storing a plurality of components executable by the one or more processors, the plurality of components comprising:

a virtual environment programmed to include a plurality of virtual objects;

a sensor model programmed to model a sensor in the virtual environment;

a positioning module programmed to set a location and an orientation of the sensor in the virtual environment, wherein at least one of the virtual objects is a mobile virtual object, and wherein the sensor is on the mobile virtual object; and a simulation module programmed to utilize the virtual environment, the sensor model and the positioning module to produce simulation-generated data characterizing the virtual environment as perceived by the sensor as the mobile virtual object and the virtual sensor move around in the virtual environment to model an output of the sensor in a real-world scenario sensing a real-world environment similar to or matching the virtual environment, wherein the one or more processors execute the plurality of components to develop, test or train a computer vision detection algorithm by modeling the real-word environment with the virtual environment such that the simulation-generated data represents information collected by one or more real-word sensors in the real-word environment.

14. The sensor data generation system of claim 13, wherein the virtual environment comprises a three-dimensional (3D) environment, and wherein each of the plurality of virtual objects is either stationary or mobile relative to the sensor in the 3D environment.

15. The sensor data generation system of claim 13, wherein the sensor comprises a virtual camera, and wherein the data comprises one or more virtual images of the virtual environment as perceived by the virtual camera at the location and in the orientation.

16. The sensor data generation system of claim 15, wherein each of the one or more virtual images comprises an array of pixels, each pixel of the array of pixels associated with a respective one of the plurality of virtual objects as perceived by the virtual camera at the location and in the orientation.

17. The sensor data generation system of claim 16, wherein the depth map comprises an array of elements, each element of the array of elements corresponding to a respective pixel of the array of pixels and comprising a respective numerical value, each numerical value corresponding to a distance in the virtual environment between the sensor and a respective one of the plurality of virtual objects associated with the respective pixel.

18. The sensor data generation system of claim 17, wherein the distance between the sensor and the respective one of the plurality of virtual objects associated with the respective pixel is determined based on a coordinate of the location and a coordinate of the respective one of the plurality of virtual objects in the virtual environment.

19. The sensor data generation system of claim 13, wherein the memory further stores the data and the depth map.

20. The sensor data generation system of claim 13, wherein the plurality of components further comprise:

an ambience module programmed to account for at least a weather condition and a lighting condition of the virtual environment; and an annotation module programmed to annotate the data with a depth map characterizing a spatial relationship between the sensor and one or more of the plurality of virtual objects in the virtual environment.

* * * * *